United States Patent
Diekhans et al.

(10) Patent No.: US 9,089,092 B2
(45) Date of Patent: Jul. 28, 2015

(54) HARVESTING MACHINE HAVING CROP FEED REGULATION

(71) Applicant: CLAAS SELBSTFAHRENDE ERNTEMASCHINEN GMBH, Harsewinkel (DE)

(72) Inventors: Norbert Diekhans, Guetersloh (DE); Bastian Kriebel, Muenster (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 134 days.

(21) Appl. No.: 13/970,777

(22) Filed: Aug. 20, 2013

(65) Prior Publication Data

US 2014/0059988 A1  Mar. 6, 2014

(30) Foreign Application Priority Data

Aug. 30, 2012 (DE) .......................... 10 2012 017 149

(51) Int. Cl.
*A01D 41/00* (2006.01)
*A01D 41/127* (2006.01)
*A01D 43/08* (2006.01)

(52) U.S. Cl.
CPC ........ *A01D 41/1274* (2013.01); *A01D 41/1271* (2013.01); *A01D 43/085* (2013.01)

(58) Field of Classification Search
CPC ............ A01D 41/127; A01D 41/1274; A01D 43/085; A01D 75/18; A01D 69/00; A10F 29/10; F02D 31/001; F02D 2250/18; G07C 5/0808
USPC ....... 56/10.2 R, 10.2 A, 10.2 E, 10.2 G, 16.4; 701/50, 29.1, 29.2, 31.6, 31.8, 33.4, 701/33.7
See application file for complete search history.

(56) References Cited

U.S. PATENT DOCUMENTS

| | | | |
|---|---|---|---|
| 6,584,390 B2 | 6/2003 | Beck | |
| 8,161,718 B2 * | 4/2012 | Bussmann et al. | ......... 56/10.2 G |
| 8,230,667 B2 * | 7/2012 | Finkler et al. | ............. 56/10.2 A |
| 8,428,830 B2 * | 4/2013 | Diekhans et al. | ............... 701/50 |
| 8,600,627 B2 * | 12/2013 | Beck et al. | ...................... 701/50 |

FOREIGN PATENT DOCUMENTS

EP    1 271 139    1/2003

* cited by examiner

*Primary Examiner* — Robert Pezzuto
(74) *Attorney, Agent, or Firm* — Michael J. Striker

(57) ABSTRACT

A self-propelled harvesting machine includes an intake assembly configured to pick up crop from a field and conveying the crop, a processing assembly for receiving the conveyed by the intake assembly and a sensor for estimating the crop throughput of the intake assembly and a ground drive. The forward speed (V) of the ground drive and a drive speed (C) of the intake assembly can vary depending on the crop throughput.

13 Claims, 2 Drawing Sheets

HARVESTING MACHINE HAVING CROP FEED REGULATION

CROSS-REFERENCE TO A RELATED APPLICATION

The invention described and claimed hereinbelow is also described in German Priority Document DE 10 2012 017149.8, filed on Aug. 30, 2012. The German Priority Document, the subject matter of which is incorporated herein by reference, provides the basis for a claim of priority of invention under 35 U.S.C. 119(a)-(d).

BACKGROUND OF THE INVENTION

The invention relates to a self-propelled harvesting machine, such as a forage harvester or a combine harvester. Harvesting machines generally comprise an intake assembly, which includes a front attachment that can be replaced depending on the crop and, a processing assembly, which comprises at least one chopping or threshing mechanism.

In order to ensure a high and constant quality of processing via the processing assembly, it is desirable to have the capability to feed a stream of crop having an unvarying thickness to this processing assembly. To this end, it is known to regulate the forward speed of the harvesting machine in a manner that is inversely proportional to the stand density of the crop on the field. Difficulties arise with such known operation, however, when the density of the stand to be harvested temporarily fluctuates. For example, when the harvesting machine suddenly enters a region having a high stand density, the crop throughput in the intake assembly may increase, before the forward speed can be adjusted. The processing assembly therefore becomes unable to handle the crop throughput. In a case of a forage harvester in particular, such operation can cause the engine to stall. In a case of a combine harvester, the result can be that a large proportion of non-grain material reaches the grain tank or, that a large quantity of grain is separated out with chaff and stalks or both.

In order to be able to react to fluctuations in the stand density, it is desirable per se to detect these fluctuations at an early point in time, namely (if possible), before the harvesting machine enters the region having a high stand density. Doing so could ensure that the forward speed can be adjusted in a timely manner. Detection of this type, however (which is necessarily contactless), is highly unreliable. One example is known from EP 1 271 139 A2. High costs of this technology have so far stood in the way of the widespread implementation of the technology.

SUMMARY OF THE INVENTION

The present invention overcomes the shortcomings of known arts, such as those mentioned above.

To that end, the present invention provides a self-propelled harvesting machine in which the crop feed to a processing assembly is held constant using simple and reliable means.

In an embodiment, the invention embodies a self-propelled harvesting machine comprising an intake assembly with means for picking up crop from a field and conveying the crop, a processing assembly to which the crop is conveyed from the intake assembly, means for estimating the crop throughput of the intake assembly and a ground drive. The forward speed of the ground drive can vary depending on the crop throughput. It also is possible to vary a drive speed at which the intake assembly is driven depending on the crop throughput.

Even if the means for estimating the crop throughput do not detect an increase in the crop stream due to the harvesting machine entering a region of high stand density until shortly before the crop stream reaches the processing assembly, the feed rate of the crop to the processing assembly is held within a permissible range. Alternatively, the invention at least enables the range of fluctuation of the feed rate can be considerably reduced. Although slowing the intake assembly results in an increase in the layer thickness of the crop in the intake assembly, this increase in layer thickness can be managed via the extent by which the forward speed is reduced.

In practical application, an intake assembly having a variable drive speed is designed as a front attachment that can be replaced depending on the crop to be processed. Basically, however, non-replaceable components of the harvesting vehicle that convey the crop to the processing assembly also can be assigned to the drive assembly, and the speed thereof can be varied.

A reduced forward speed should be maintained, advantageously, until the region having high stand density has been passed through. The drive speed of the crop conveying means of the intake assembly should be restored to normal, advantageously, after a specified time period if a section of the crop stream having high layer thickness (which formed in the intake assembly upon entry into the region having high stand density and before the forward speed was reduced) has been processed.

The time period after which the reduction in forward speed is restored to normal, therefore, should at least correspond to the throughput time of the crop through the intake assembly.

If the drive speed of the intake assembly remains low after the section having high layer thickness has been processed, the result is an unwanted reduction in the feed rate to the processing assembly. Therefore, after the section having an increased layer thickness has been processed, the drive speed should return to the original value as quickly as possible. The return preferably should be no later than 1½ times the throughput time.

When the reduced drive speed is restored to normal, the layer thickness of the crop stream in the intake assembly is reduced. The reduced layer thickness is detected with a certain delay by the means for estimating the crop throughput and, after the throughput time, also affects the feed rate to the processing assembly. In order to ensure that this does not result in a plurality of successive speed adaptations, the control unit is designed so that it does not react to a change in the crop throughput within a specified time period after the reduced drive speed is restored to normal.

Alternatively, when the reduced drive speed is restored to normal, the reduced forward speed is simultaneously partially restored to normal. If the relative changes in forward speed and drive speed that occur are identical, inconsistencies in the layer thickness of the crop stream can be prevented.

When the harvesting machine emerges from a region having a high stand density, the layer thickness of the crop stream spreading through the intake assembly is reduced at first. Since there is no risk that the engine will stall in this case, there is no need to simultaneously change the drive speed of the intake assembly in this case.

A sensor for detecting a torque driving the crop stream at the intake assembly is provided in order to estimate the crop throughput.

The crop throughput is estimated by reference to the speed and cross-sectional dimensions of the crop throughput. Since the width of the stream is typically specified via the design of the intake assembly, a sensor for detecting the thickness of the crop stream conveyed in the intake assembly supports determining same.

Since the thickness of the crop stream in the intake assembly and the torque required to convey the crop stream also affect the engine load, the crop throughput also can be determined by reference to the engine load.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
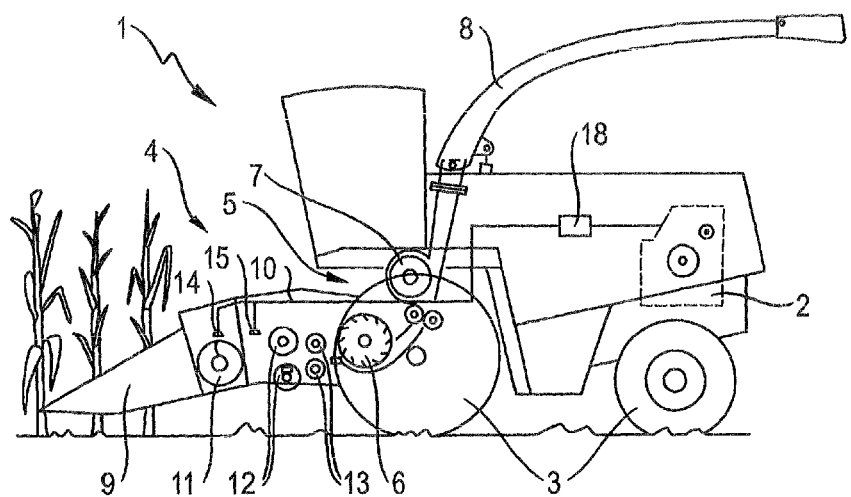
FIG. 1 is a schematic depiction of a forage harvester according to the invention.

FIG. 1 shows a forage harvester 1, as one embodiment of a self-propelled harvesting machine with crop feed regulation according to the present invention. As shown, a diesel engine 2 drives, via an auxiliary gearbox (not shown in FIG. 1), aground drive 3 as well as an intake assembly 4 and a processing assembly 5. The processing assembly 5 comprises a chopper drum 6, a roller pair 13, which feeds plant material conveyed through the intake assembly 4 to the chopper drum 6, and post-accelerator 7. The post-accelerator 7 provides the chopped plant material with the speed required to pass through an upper discharge chute 8 and be transferred to an (non-illustrated) accompanying vehicle. The ratio of the speeds of the roller pair 13 and the chopper drum determines the quality of the chopped plant material, more precisely the length of cut of the chopped plant material. In order to adjust the length of cut, the ratio of speeds is changed. During a harvesting operation, however, the speeds are in a fixed ratio relative to one another in order to hold the quality of the chopped material constant.

While other types of self-propelled harvesting machines such as combine harvesters or balers differ in terms of the processing assembly thereof, a common feature or limitation thereof is that the feed rate of the material to be processed to the processing assembly should not exceed a limit value. This feature or limitation ensures a satisfactory processing quality and prevents the processing assembly 5 from becoming jammed, which would cause the diesel engine 2 to stall.

The intake assembly 4 comprises a front attachment 9, which is replaced depending on the plant material to be harvested. The font attachment 9 is driven via a non-illustrated P.T.O shaft at a speed that is variable independently of the speed of the chopper drum 6. A non-replaceable feed rake 10 conveys the plant material harvested by the front attachment 9 to the chopper drum 6. The feed rate 10 comprises a plurality of conveying means disposed one behind the other on the conveyance path of the crop, including the aforementioned roller pair 13 and at least one roller pair 12 disposed upstream thereof, as shown in FIG. 1. If the speed of the roller pair 13 is coupled to that of the chopper drum 6 (as described above), this can be assigned to the processing assembly 5. The speed of the upstream roller pair 12 is coupled to the speed of the chopper drum 6 or that of the P.T.O. shaft. In the former case, the roller pair 12 is assigned to the intake assembly 4. In the latter case the roller pair 12 is assigned to the processing assembly 5. The feed rake 10 also can belong entirely to the intake assembly 4 if the speed of the two roller pairs 12, 13 is coupled to the speed of the P.T.O. shaft.

The front attachment 9 comprises knives (not shown in the figure) for cutting the stalks of the plant material to be harvested. The knives are disposed on the front edge of the front attachment, which generally extends across the width of several meters. A conveyor auger 11 extending across the entire width of the front attachment 9 is used to push the plant material together toward the center of the front attachment 9, where it is transferred to the feed rake 10.

The knives and the conveyor auger 11 of the front attachment are connected to the engine 2 via a P.T.O. shaft (not shown in the figure). The torque exerted thereby is proportional to the quantity of plant material in the front harvesting attachment 9. The measurement thereof by means of a torque sensor 14 makes it possible to estimate the crop throughput in the front attachment 9. FIG. 1 shows this sensor 14 at the conveyor auger 11 of the front attachment 9; however, placement directly at the P.T.O. shaft is also advantageous.

Alternatively or in addition thereto, a sensor 15 (for example, an optical sensor), is provided on the path of the crop through the forage harvester 1 in order to detect the layer thickness of the crop stream. The sensor 15 is placed as far upstream as possible on the path of the crop, in order to detect changes in the crop stream at the earliest point in time possible. The sensor 15 is preferably disposed at the inlet of the feed rake 10, as shown, in order to detect the complete stream that is picked up across the entire width of the front attachment 9 in a distributed manner.

The product of the layer thickness detected by the sensor 15 and the conveying speed of the material are proportional to the throughput.

The torque used to drive the roller pairs 12, 13 also depends on the material throughput of the intake assembly 4. Therefore, a torque sensor mounted on one of the roller pairs 12, 13 is also used to estimate the throughput of the intake assembly 4. The measurement of the P.T.O. shaft torque is preferred, however, since this reacts more quickly to a change in the stand density of the crop.

Figure 2:
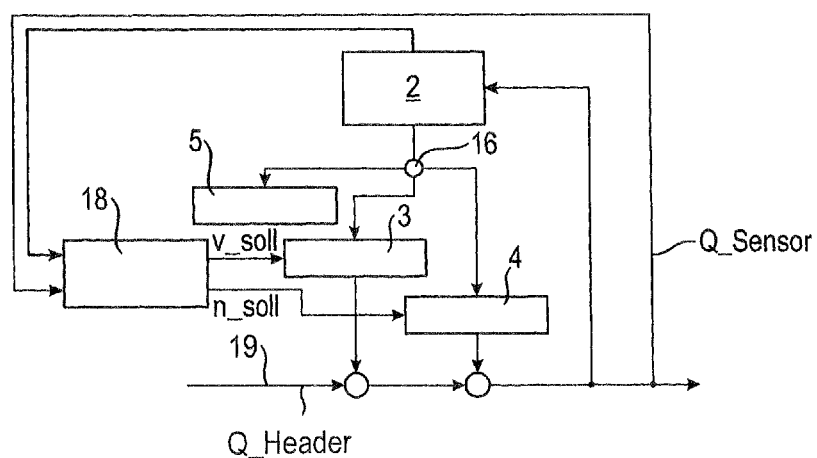
FIG. 2 is a block diagram of the drive system of the forage harvester.

FIG. 2 shows a block diagram of the drive system of the forage harvester 1. The torque of the diesel engine 2 is distributed via an auxiliary gearbox 16 to the ground drive 3, the intake assembly 4 and the processing assembly 5. The objective of the control of the forage harvester 1 is to hold the feed rate of the plant material to the processing assembly 5 constant, which is symbolized by an arrow 19 at the lower part of FIG. 2. From this in can be assumed that the portion of engine power utilized by the processing assembly 5 to process the material fed at a substantially constant rate is constant.

The power required by the ground drive 3 and the intake assembly 4 in order to deliver material at this constant rate can vary. An electronic forward-speed regulator 18 outputs setpoint values n_soll, v_soll for the rotational speed of the P.T.O. shaft driving the intake assembly 4 and for the ground speed of the forage harvester 1. In the schematic depiction of FIG. 2, these setpoint values are received by the intake assembly 4 and the ground drive 3. In practical application, the setpoint values also are received by a control unit of the auxiliary gearing 16 or the diesel engine 2, in order to regulate the ratio at which the engine power is transferred to the intake assembly 4 and ground drive 3, and the total power of the diesel engine 2 such that the setpoint values n_soll, v_soll are adhered to in stationary operating conditions.

An arrow 19 at the bottom of FIG. 2 (as shown) represents the crop that is continuously picked up by the forage harvester. The actual forward speed v_ist of the forage harvester 1 determines the rate Q_Header at which the crop enters the front attachment 9. Temporary changes in the rotational speed n_ist of the P.T.O. shaft can cause the rate at which the crop reaches the processing assembly 5 to deviate from the pick-up rate Q_Header.

Figure 3:
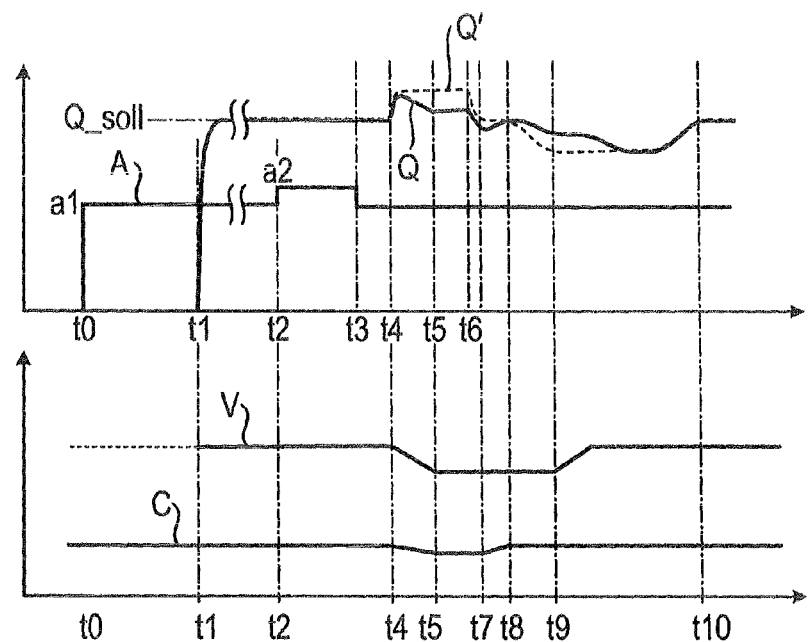
FIG. 3 depicts a development over time of operating variables of the forage harvester according to a first embodiment of the invention.

FIG. 3 illustrates the mode of operation of the forward-speed regulator 18 by reference to exemplary time diagrams. A curve A represents the density a of a plant stand to be harvested (indicated in t/ha, for example). The stand density is 0 when the forage harvester 1 moves outside the stand, before time t0 in FIG. 3. Upon entry into the stand, the stand density changes to a value a1, which is assumed to be constant in this case, for simplicity. The rate at which plant material is picked up by the front attachment 9 is therefore determined as follows:

$$Q\_Header = a*b*v\_ist$$

wherein b is the width of the front attachment and v_ist is the actual forward speed of the forage harvester 1. The plant material picked up by the front attachment 9 starting at time t0 requires a certain amount of time, until time t1, to pass through the front harvesting attachment 9 and reach the sensor 15.

Up to time t1, therefore, the forward speed of the forage harvester 1 cannot yet be controlled in a meaningful manner by the forward-speed regulator 18, as indicated by a dashed course of the curve V (which represents the forward speed). As shown in FIG. 3, it is assumed (for simplicity), that the forward speed is matched to the stand density a1 from the beginning such that the feed rate of the crop to the processing assembly 5 (depicted by a curve Q) corresponds to a setpoint value Q_Soll. If this were not the case, the forward-speed regulator 18 would adjust the forward speed over the course of time in a manner known per se until the setpoint value Q_Soll is reached.

At time t2, the forage harvester 1 reaches a region having an increased stand density a2. This results in an increase in the material stream Q_Header at the inlet to the front harvesting attachment 9. The increase does not affect the Rate Q_Sensor detected by the sensor 15, however, provided this has not yet spread to the feed rake 10. Such spread does not take place until time t4. The forward-speed regulator 18 reacts to the increase in the feed rate Q_Sensor by simultaneously reducing the forward speed (see curve V) and the P.T.O. speed, as depicted by curve C.

The rate Q_Header at which the front harvesting attachment 9 picks up plant material also decreases in proportion to the slowing of the forage harvester 1. This decrease results in a reduction of the layer thickness of the material stream conveyed through the front harvesting attachment 9. The reduction in layer thickness, however, is less in terms of percentage than the reduction in forward speed, since the simultaneous slowing of the P.T.O. shaft causes the material to be conveyed more slowly through the front harvesting attachment 9.

The slowing of the P.T.O. shaft causes the material that is already located in the front harvesting attachment with a large layer thickness to be transferred more slowly to the feed rake 10. The Rate Q_Sensor therefore increases after t4 only briefly to a maximum and then, drops in proportion to the slowing of the P.T.O. shaft until the setpoint value Q_Soll, plus a permissible deviation in this case, is reached once more at t5. Therefore, the quantity of material stored in the front harvesting attachment 9 with a large layer thickness is processed in the processing assembly 5 without the processing assembly 5 becoming overloaded. And, the material that is simultaneously moving into the front harvesting attachment 9 forms a layer there having a thickness that is substantially the same as in the stationary operation before time t2.

A curve Q' shows, for comparison, the rate Q_Sensor', which would result as the measurement value of the sensor 15 if the speed of the P.T.O. shaft were independent of Q_Sensor' in the conventional manner. Starting at t4, the rate Q_Sensor' increases from a1 to a2 in accordance with the increase in density and remains at the high value until a change in the layer thickness spreads to the sensor 15. The change is due to the reduction of the forward speed v starting at time t4 or is due to a new change in the stand density.

A decrease in the feed rate Q_Sensor is observed at time t6. The decrease is due to the forage harvester 1 having already left the region of high stand density previously, at time t3, and the resultant reduction in layer thickness now having spread to the sensor 15. This decrease accidentally coincides here with the onset of an increase in the P.T.O. speed C at time t7. This increase is controlled by the forward-speed regulator 18 in terms of time such that, when the speed increase ends at time tR, all the material harvested in the time interval [t2, t3] has left the front harvesting attachment 9.

If the stand density would have remained constant at a2 during this time, then the resultant thick material layer in the front harvesting attachment 9 would have now been completely removed. And since the thinner layer that is entering is fed to the feed rake 10 more rapidly due to the acceleration of the P.T.O. shaft, the feed rate Q_Sensor thereof could be held constant.

Moreover, although an increase in the feed rate Q_Sensor also is observed simultaneously with the increase in the P.T.O. speed C, this cannot compensate the reduction in material flow in the front harvesting attachment 9 resulting from the decrease in stand density from a2 to a1. Consequently, a value is ultimately reached that is so low that, at time t9, the forward-speed regulator 18 also increases the forward speed once more.

The forward speed is increased in steps. If the forward speed has been changed, it remains at the newly set value independently of the current feed rate Q_Sensor until this value has affected the feed rate, at time t10 in this case.

Figure 4:
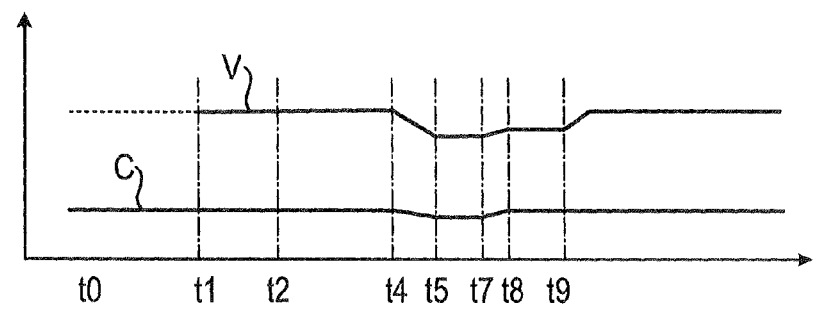
FIG. 4 shows a development over time of operating variables of the forage harvester according to a second embodiment of the invention.

FIG. 4 shows the curves V, C according to a modification of the invention. Up to time t7, the reactions of the forward-speed regulator 18 to the changes in the stand density according to curve A are the same as in the case depicted in FIG. 3. Simultaneously with the increase in the P.T.O. speed C, however, the forward speed v also is increased here by the same percentage. As a result, if the stand density does not change at the same time, the layer thickness of the crop stream in the front harvesting attachment 9 remains unchanged. The decrease in the feed rate Q_Sensor (which is observed between t9 and t10 in FIG. 3) and, which is due to the sole acceleration of the P.T.O. shaft, can thereby be prevented.

In the description of the behavior of the forward-speed regulator 18 provided above, the focus was solely on measuring the crop stream by means of the sensor 15. It can be inferred therefrom that a corresponding control of the forward speed and the P.T.O. speed of the front attachment drive also can be carried out on the basis of a feed rate Q_Sensor estimated with the aid of the torque sensor 14. An advantage of the torque sensor 14 is that a change in the rate Q_Header affects the measurement value of the sensor 14 sooner than that of the sensor 15, while a disadvantage is that temporary changes in the rate Q_Header are less noticeable in the measurement value of the sensor 14 than in that of the sensor 15. Of course, Q_Sensor also could be derived from a combination of measurement values from both sensors 14, 15 or other suitable sensors, in particular a sensor detecting the entire load of the engine 2.

LIST OF REFERENCE CHARACTERS 1 forage harvester
2 diesel engine
3 ground drive
4 intake assembly
5 processing assembly
6 chopper drum
7 post-accelerator
8 upper discharge chute
9 front harvesting attachment
10 feed rake
11 conveyor auger
12 roller pair
13 roller pair
14 sensor
15 sensor
16 auxiliary gearbox
17 auxiliary gearbox
18 forward-speed regulator
19 arrow As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A self-propelled harvesting machine, comprising
   an intake assembly (4) configured with means for picking up crop from a field and conveying the crop,
   a processing assembly (5) to which the crop is conveyed by the intake assembly (4),
   means (14, 15) for estimating a crop throughput of the intake assembly (4), and
   a ground drive (3) having a forward speed (V) that varies depending on the crop throughput,
   wherein a drive speed (C) of the intake assembly (4) is varied depending on the crop throughput.

2. The self-propelled harvesting machine according to claim 1, wherein the intake assembly (4) is a replaceable front harvesting attachment (9).

3. The self-propelled harvesting machine according to claim 1, wherein the intake assembly (4) comprises a replaceable front harvesting attachment (9) and at least one conveying means (12) disposed between the front harvesting attachment (9) and the processing assembly (5).

4. The self-propelled harvesting machine according to claim 1, wherein a control unit (18) is connected to the means (14, 15) for estimating the crop throughput and reduces the forward speed (V) and the drive speed (C) if the crop throughput increases beyond an upper limit value.

5. The self-propelled harvesting machine according to claim 4, wherein a relative change of the drive speed (C) is less than the relative change of the forward speed (V).

6. The self-propelled harvesting machine according to claim 4, wherein the control unit (18) restores a reduced drive speed (C) to normal after a predefined time period.

7. The self-propelled harvesting machine according to claim 6, wherein the predefined time period corresponds, at the least, to the throughput time of the crop through the intake assembly (4).

8. The self-propelled harvesting machine according to claim 6, wherein the control unit (18) does not react to a change in the crop throughput within the predefined time period after the reduced drive speed (C) is restored to normal.

9. The self-propelled harvesting machine according to claim 6, wherein the control unit (18) partially restores the reduced forward speed to normal after the predefined time period.

10. The self-propelled harvesting machine according to claim 4, wherein the control unit (18) reduces the forward speed (V) and maintains the drive speed (C) if the crop throughput drops below a lower limit value.

11. The self-propelled harvesting machine according to claim 1, wherein the means for estimating the crop throughput comprises a sensor (14) for detecting a torque acting on a means (11) for conveying the crop.

12. The self-propelled harvesting machine according to claim 1, wherein the means for estimating the crop throughput comprises a sensor (15) for detecting the thickness of a crop stream conveyed in the intake assembly (4).

13. The self-propelled harvesting machine according to claim 1, wherein the means for estimating the crop throughput detects a load of an engine (2) driving the intake assembly (4).

* * * * *